US008256354B2

(12) United States Patent
Aaron et al.

(10) Patent No.: US 8,256,354 B2
(45) Date of Patent: Sep. 4, 2012

(54) SIDE DUMP AND BOTTOM DUMP RAILROAD CARS

(75) Inventors: Charles W. Aaron, Salado, TX (US); Christopher M. Villar, Liberty Hill, TX (US)

(73) Assignee: Georgetown Rail Equipment Company, Georgetown, TX (US)

( * ) Notice: Subject to any disclaimer, the term of this patent is extended or adjusted under 35 U.S.C. 154(b) by 89 days.

(21) Appl. No.: 12/715,236

(22) Filed: Mar. 1, 2010

(65) Prior Publication Data

US 2010/0218700 A1 Sep. 2, 2010

Related U.S. Application Data

(60) Provisional application No. 61/156,783, filed on Mar. 2, 2009.

(51) Int. Cl.
*B61D 7/04* (2006.01)
*B61D 7/10* (2006.01)

(52) U.S. Cl. ............... 105/261.1; 105/239; 298/1 B; 298/18

(58) Field of Classification Search ....... 105/261.1–279, 105/239, 247; 298/1 B, 17 R, 18, 24, 27, 298/30, 31, 35 R
See application file for complete search history.

(56) References Cited

U.S. PATENT DOCUMENTS

| 1,509,113 A | 9/1924 | Slaker |
| 2,821,433 A | 7/1955 | Hamlet |
| 3,631,812 A | 1/1972 | Winslow, Jr. |
| 3,998,986 A * | 12/1976 | Williams .................. 428/102 |
| 4,116,485 A * | 9/1978 | Svensson .................. 296/39.1 |
| 4,460,110 A | 7/1984 | Helander |
| 5,265,940 A | 11/1993 | Ostermeyer |
| 5,346,304 A | 9/1994 | Kleinhans |
| 5,417,165 A | 5/1995 | Peppin et al. |
| 6,068,927 A * | 5/2000 | Stenman .................. 428/409 |
| 7,025,407 B2 * | 4/2006 | Medel .................. 296/183.2 |

OTHER PUBLICATIONS

International Preliminary Report on Patentability issued is related PCT application PCT/US10/25847 dated May 3, 2011.
Search Report and Written Opinion from related application No. PCT/US2010/025847 dated Apr. 29, 2010.

* cited by examiner

*Primary Examiner* — S. Joseph Morano
*Assistant Examiner* — Zachary Kuhfuss
(74) *Attorney, Agent, or Firm* — Parsons Behle & Latimer

(57) ABSTRACT

A railroad car may comprise a frame comprising a first side and a second side laterally opposing each other. The railroad car may further comprise a first elastomeric mat and a second elastomeric mat supported by a plurality of reinforcement cables, the first and second elastomeric mats forming a load-carrying receptacle. Each elastomeric mat may have an outer edge and an inner edge, the inner edge of the first elastomeric mat abutting the inner edge of the second elastomeric mat when the load-carrying receptacle is in a closed configuration. The railroad car may further comprise a first pulley connected to the first side of the frame and a second pulley connected to the second side of the frame, the first pulley and second pulley each having a respective axis of rotation parallel to a direction of travel of the railroad car.

19 Claims, 3 Drawing Sheets

SIDE DUMP AND BOTTOM DUMP RAILROAD CARS

RELATED APPLICATION

This application claims the benefit of U.S. Provisional Application No. 61/156,783 entitled Side Dump and Bottom Dump Railroad Cars, filed Mar. 2, 2009, which is incorporated by reference herein.

TECHNICAL FIELD

The present disclosure generally relates to railroad dump cars and, in particular, to railroad dump cars having one or more cable-reinforced elastomeric mats that form a receptacle into which bulk material may be deposited for transport and/or distribution.

BACKGROUND

Traditional railroad cars are designed to transport and dispense bulk material such as coal, stone, or other particulate material. Such railroad cars may include side dump or bottom dump railroad cars. Typical railroad dump cars are well-known in the art. A railroad dump car typically includes a receptacle for carrying bulk material and a railroad car frame. The railroad car frame may have a plurality of trucks, each truck comprising a plurality of wheels, axles, and bearings.

Typically, railroad cars used for transporting and dispensing bulk material are manufactured primarily of steel. The receptacle of a railroad car may have steel side and bottom panels that come into frequent contact with the bulk material. The use of steel in these panels poses certain disadvantages.

One disadvantage of the use of steel in railroad car construction is weight. Thick steel plating is typically used in railroad cars due to the abrasive nature of the bulk material carried in the railroad cars. Without such a durable material, the constant dumping and shifting of the bulk materials would wear through the panels in a short time, necessitating frequent repairs and resulting in costly delays. The use of thick steel plating may delay the necessity of repairs due to wear, but it adds a significant amount of weight to railroad cars. Many railroad cars are restricted to certain weight limits that include the payload weight plus the weight of the railroad car itself. Accordingly, any increase in a railroad car's weight may reduce the amount of payload it can carry and still stay within the weight limit.

Another disadvantage of traditional railroad car construction is carry-back. Carry-back, a phenomenon well-known in the art, occurs when bulk material being transported is frozen or damp, giving the material a propensity to amass into clumps and adhere to the railroad car's inside surfaces. Such clumps may remain stuck to the inside surface of the railroad cars even during dumping operations, thus reducing the amount of material dispensed and reducing the amount that can be subsequently loaded. Carry-back effectively reduces payload and increases the weight of the railroad car.

Another disadvantage of traditional railroad car construction is reduced wear resistance and/or durability. As noted above, thick steel plating is used due to the abrasive nature of different types of bulk materials. However, the steel plating still wears out over the course of normal usage of the railroad cars. When a portion of a railroad car has worn out, repairs can be costly and time-consuming. Resulting delays can add significantly to operating costs.

Yet another disadvantage is noise. As bulk materials are dumped into a steel railroad car, the resulting noise may be very loud, which may be harmful and/or disturbing to people in the vicinity. Another potential disadvantage is the jarring impact from dumping bulk material into a steel railroad car. This impact can increase wear on other components of the railroad car.

U.S. Pat. No. 4,116,485 to Svensson ("the '485 patent") discloses a "bulk material carrying container defined by a framework including a base and a pair of opposing, generally parallel upright sides carried by the base." The '485 patent further discloses an elastomeric sheet "that is secured to and suspended between the sides so that it forms a generally concave receptacle into which bulk material and the like may be dropped." U.S. Pat. No. 6,068,927 to Stenman ("the '927 patent") describes a "bulk material handling wear mat of elastomeric material having good wear and impact resistance" that "is suitable for use as a wear lining in haulage vehicles." Notably, the '485 and '927 patents do not disclose any implementation of elastomeric materials in railroad cars and, in particular, do not disclose any configuration of elastomeric sheets in side or bottom dump railroad cars.

The present disclosure is directed to overcoming, or at least reducing, the effects of one or more of the issues set forth above.

SUMMARY

In light of the foregoing, it would be desirable to provide a railroad car with an elastomeric load-carrying receptacle that exhibits lighter weight, lower propensity for carry-back, increased durability, and quieter operation in comparison to traditional railroad cars with steel receptacles. It would also be desirable to provide such a railroad car that has side and/or bottom dump capabilities.

In one illustrative embodiment, a bottom dump railroad car for transporting bulk material is disclosed that has a frame, a first and a second cable-reinforced elastomeric mat, and a first and a second elongated cylindrical pulley. The frame may have a first side and a second side laterally opposing each other, and the frame may be connected to a plurality of railroad wheels. The mats may be supported by a plurality of reinforcement cables and may form a load-carrying receptacle. Each mat may have an outer edge and an inner edge. The inner edge of the first mat may meet the inner edge of the second mat while the bottom dump railroad car is in a closed configuration. The first and second pulleys may be rotatably connected to the first and second sides of the frame, respectively. The axis of rotation of each pulley may be parallel to the railroad car's direction of travel. The first and second elastomeric mats may wrap at least partially around the first and second pulley, respectively. The first and second pulleys may be adapted to move the elastomeric mats away from each other to form a discharge opening in the load-carrying receptacle, thereby transforming the bottom dump railroad car from the closed configuration to an open configuration.

Each elastomeric mat may be connected to a first brace and a second brace. The first brace may be fixed to the inner edge of the elastomeric mat and the second brace may be fixed to the outer edge of the elastomeric mat. The braces may have a series of holes through which reinforcement cables are threaded.

In another illustrative embodiment, a side dump railroad car for transporting bulk material is disclosed that has a frame, at least one cable-reinforced elastomeric mat, and a first and a second side support wall. The frame may have first and second laterally-opposing sides and a plurality of railroad wheels. The at least one elastomeric mat may be supported by a plurality of reinforcement cables and may form a load-carrying receptacle. The mat may have first and second opposing lateral side edges. The first and second side support walls may be rotatably connected to the first and second laterally-opposing sides, respectively. The side support walls may each have an axis of rotation parallel to the railroad car's direction of travel. Each side support wall may connect to the elastomeric mat and the plurality of reinforcement cables. The elastomeric mat and reinforcement cables may be suspended between the side support walls.

The side dump railroad car may include at least one linkage assembly that may link the pivoting side support walls to each other and to the railroad car frame. The linkage assembly may restrict and synchronize the rotation of the side support walls.

In another illustrative embodiment, a railroad dump car for transporting bulk material is disclosed that has one or more cable-reinforced elastomeric mats forming at least one load-carrying receptacle.

BRIEF DESCRIPTION OF THE DRAWINGS

For a more complete understanding of the present disclosure and its advantages, reference is now made to the following description taken in conjunction with the accompanying drawings, in which.

DETAILED DESCRIPTION

Figure 1:
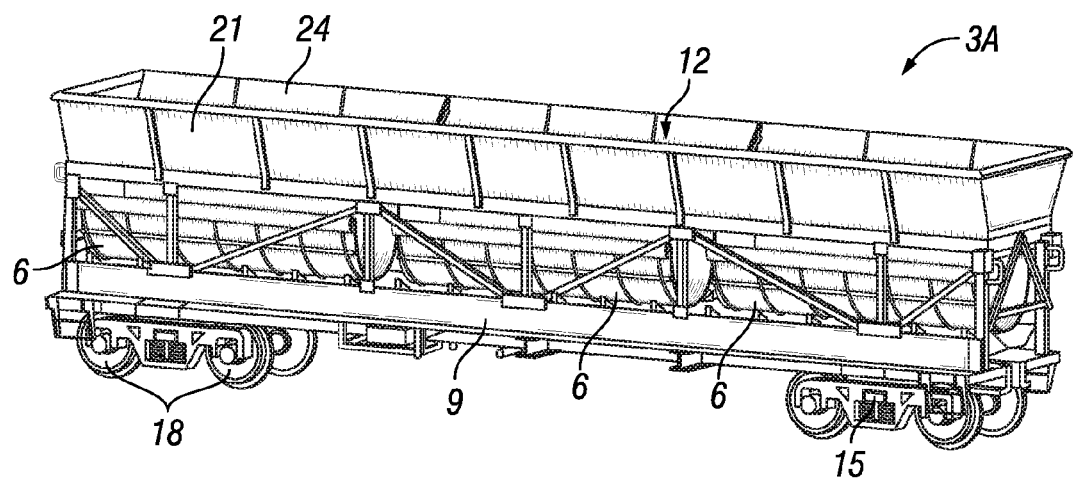
FIG. 1 illustrates a bottom dump railroad car, according to certain embodiments.

FIG. 1 illustrates a bottom dump railroad car 3A comprising a plurality of elastomeric mats 6, according to certain embodiments. The mats 6 comprise at least one first elastomeric mat 6A (shown in FIGS. 2 and 3) and at least one second elastomeric mat 6B (shown in FIGS. 2 and 3) suspended over a railroad car frame 9. The bottom dump railroad car 3A may have three pairs of elastomeric mats 6. Each pair of mats 6 may comprise or consist of two opposing mats 6A and 6B. Mat 6A may extend roughly from the centerline of the railroad car 3A to one side of the railroad car 3A, and mat 6B may extend roughly from the centerline of the railroad car 3A to the other side of the railroad car 3A. Together, each pair of mats 6A and 6B may form a concave shape, creating a receptacle 12 that may be used to carry bulk material. The railroad car frame 9 may have a bottom opening that allows material to pass through when the elastomeric mats 6A and 6B are pulled apart, as described below. The frame 9 may be connected to a plurality of trucks 15. Each truck 15 may have a plurality of wheels 18, axles, and bearings, as is well-known in the art. The bottom dump railroad car 3A may further include an upper hopper 21 positioned above the elastomeric mats 6A and 6B. The upper hopper 21 may be manufactured from any suitable rigid material such as, for example, steel. As shown in FIG. 1, the upper hopper 21 may have inclined surfaces 24 that guide bulk material deposited into the railroad car 3A to fall into the receptacle 12.

Figure 2:
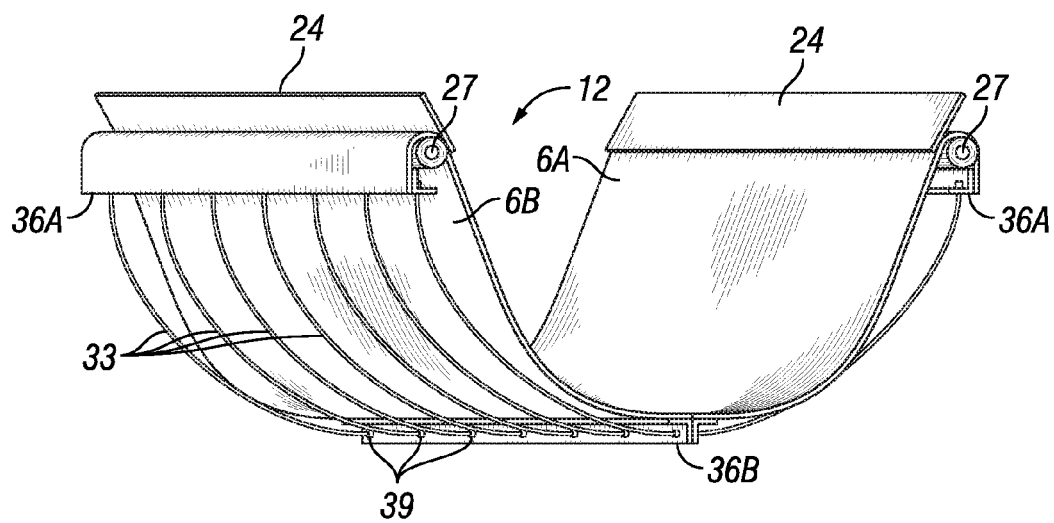
FIG. 2 illustrates a pair of elastomeric mats of the bottom dump railroad car in a closed configuration, according to certain embodiments.
Figure 3:
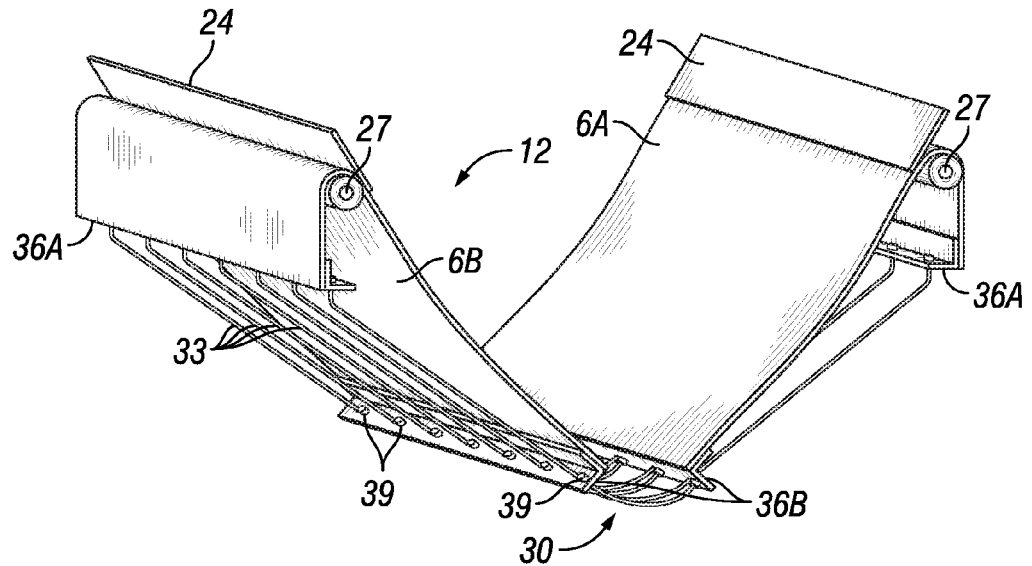
FIG. 3 illustrates a pair of elastomeric mats of the bottom dump railroad car in an open configuration, according to certain embodiments.

As shown in FIGS. 2 and 3, each elastomeric mat 6A and 6B may be partially wrapped around at least one cylindrical pulley 27 at an outer edge of the car 3A (shown in FIG. 1). Each pulley 27 may have an elongated cylindrical shape, with an axial length roughly equal to the longitudinal length of the elastomeric mats 6A and 6B. The longitudinal length of the mats 6A and 6B may be defined in a direction roughly parallel to the railroad car's 3A direction of travel. The pulleys 27 may have respective axes of rotation roughly parallel to the railroad car's 3A direction of travel. The pulleys 27 may be positioned under the upper hopper 21 such that each mat 6A and 6B extends laterally beyond the lower edges of the inclined surfaces 24. Accordingly, mats 6A and 6B may be positioned to catch bulk materials that fall down the inclined surfaces 24. By selectively rotating each pulley 27 about its axis of rotation, the mats 6A and 6B may each be pulled away from the railroad car's 3A centerline, thereby creating a discharge opening 30 (shown in FIG. 3) between the mats 6A and 6B. By rotating the pulleys 27 in the opposite direction about their axes of rotation, the mats 6A and 6B may be moved toward each other, thereby closing the discharge opening 30 between them, as shown in FIG. 2.

FIG. 2 depicts the railroad car 3A in a closed configuration wherein the elastomeric mats 6A and 6B contact each other roughly along the centerline of the railroad car 3A. FIG. 3 depicts the railroad car 3A in an open or dumping configuration wherein the mats 6A and 6B have been pulled apart by the pulleys 27, as described above, thus creating the discharge opening 30. Aggregate material (not shown) held in the receptacle 12 may be dispensed through the discharge opening 30 into a chute or onto a conveyor or area below.

Alternatively, the discharge opening 30 may be opened by applying a tension or pulling force to each mat 6A and 6B at the outer edges of mat 6A and 6B. Pulling on the outer edges of the mats 6A and 6B may cause the mats 6A and 6B to separate from each other, thereby increasing the size of the discharge opening 30. Likewise, the discharge opening 30 may be closed by releasing the pulling forces on the outer edge of each mat 6A and 6B and/or by applying a pulling force to the inner edge of each mat 6A and 6B, thereby causing the inner edges to move toward each other until the discharge opening 30 has closed. In this alternative embodiment, the pulleys 27 rotate freely, allowing the mats 6A and 6B to move in response to the pulling forces applied to them. Alternatively, opening and closing forces to the mats 6A and 6B may be provided by both pulling the mats 6A and 6B and applying a rotational force to the pulleys 27.

The railroad car 3A may include an endless conveyor belt system (not pictured) that runs the length of multiple railroad cars in a train. Bulk material may be discharged through the opening 30 onto the endless conveyor belt system and transported toward the front or rear of the train. In another embodiment, the railroad car 3A may not include an endless conveyor belt system, but rather may be adapted to discharge bulk material into a chute or onto an area below the railroad car 3A.

Each elastomeric mat 6A and 6B may be suspended over multiple transverse reinforcement cables 33. The cables 33 may be manufactured from any suitable material that has the desired properties of durability, tensile strength, and a degree of elasticity. For example, the reinforcement cables 33 may be constructed of nylon rope with a rubber coating. Alternatively, the reinforcement cables 33 may be constructed of polyester, rayon, and/or any other like material. As yet another example, the reinforcement cables 33 may be manufactured from steel and/or any other like material. The reinforcement cables 33 may exhibit a degree of elasticity, but may generally exhibit less elasticity than the mats 6A and 6B.

Each mat 6A and 6B may include an outer brace 36A and an inner brace 36B fixed along the transverse outer and inner edges of the mats 6A and 6B, respectively, as shown in FIGS. 2 and 3. More particularly, braces 36A and 36B may be fixed along the inner edge and the outer edge of each mat 6A and 6B. (The outer edge of the mat 6 may refer to the edge that is parallel to and in proximity with inclined surface 24, and the inner edge of the mat 6 may refer to the edge that runs along the centerline of the railroad car 3A.) The braces 36A and 36B may provide rigidity along the edges of the mats 6A and 6B and may help to prevent the mats 6A and 6B from collapsing under the weight of the bulk material.

Each brace 36A and 36B may be formed from any suitable material. In some embodiments, braces 36A and 36B comprise metal, wood, and/or fiber-reinforced composite materials. In some embodiments, each brace 36A and 36B may be a flat metal piece (e.g., metal strip) with a series of holes 39 along its length. Each hole 39 may have a diameter slightly larger than a diameter of the reinforcement cables 33, such that the reinforcement cables 33 may pass through the holes 39 and the braces 36A and 36B may slide along the reinforcement cables 33 while the mats 6 are moved between open and closed positions. The outer brace 36A on each elastomeric mat 6A and 6B may be fastened to an end of the reinforcement cables 33. As depicted in FIGS. 2 and 3, the outer braces 36A may be attached to the portion of each mat 6A and 6B that is draped over the pulleys 27 and hanging on the outer side of each pulley 27.

The bottom dump railroad car 3A may have certain advantages over traditional hopper railroad cars. For example, the railroad car 3A may have a lower center of gravity than a traditional hopper railroad car and may be able to hold more material in a shorter car due to the greater capacity of the railroad car 3A over traditional railroad cars. Another potential advantage is that the elastomeric mats 6A and 6B may resist clumping of wet or frozen aggregate material because of the flexible and elastic nature of the elastomeric mat 6A and 6B and cables 33. Thus, carry-back may be reduced or even eliminated in the railroad car 3A. Another potential advantage of the railroad car 3A is that the elastomeric mats 6A and 6B may exhibit greater wear resistance than traditional steel construction of traditional hopper railroad cars, which may result in lower operating costs compared to steel construction railroad cars. Another potential advantage of the railroad car 3A is that the elastomeric mats 6A and 6B and supporting reinforcement cables 33 may flex and/or stretch as material is being loaded into the railroad car 3A, thereby absorbing energy from the bulk materials falling into the railroad car 3A. Because the elastomeric mats 6A and 6B may absorb this energy, the result may be reduced noise and less jarring impact to other components of the railroad car 3A, thereby preventing and/or reducing the need for repairs. Various embodiments may have none, some, or all of the foregoing advantages.

Figure 4:
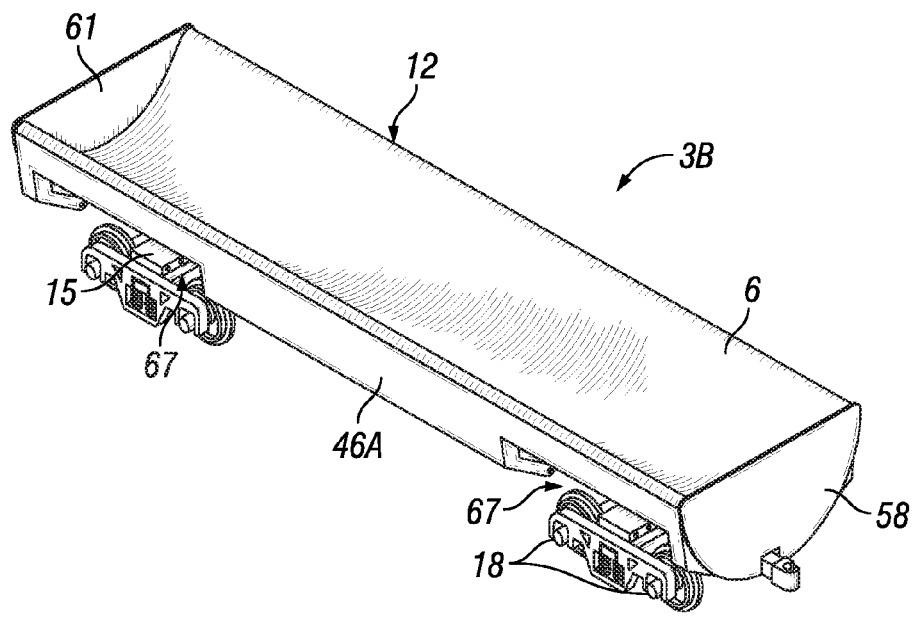
FIG. 4 illustrates a side dump railroad car, according to certain embodiments.

FIG. 4 illustrates a side dump railroad car 3B that includes an elastomeric mat 6, according to certain embodiments. The side dump railroad car 3B may include an elastomeric mat 6 suspended between a first pivoting side support wall 46A and an opposing second pivoting side support wall 46B (shown in FIGS. 5 and 6), thereby forming a receptacle 12. The side dump railroad car 3B may include a railroad car frame 9 (shown in FIGS. 5 and 6) connected to a plurality of trucks 15. Each truck 15 may have a plurality of wheels 18, axles, and bearings, as is well-known in the art. The mat 6 may be supported by reinforcement cables similar to the reinforcement cables 33 illustrated with respect to the bottom dump railroad car 3A.

Each pivoting side support wall 46A and 46B may rotate along a respective axis roughly parallel to the railroad car's 3B direction of travel. Each side support wall 46A and 46B may pivot outward from an upright position, to an intermediate (e.g., inclined) position, and finally to a reclined position. The reclined position of the side support wall 46 may be referred to as a "lowered" or "dump" position. The side dump railroad car 3B may further include a rigid first end wall 58 and a rigid second end wall 61. The side support walls 46A and 46B and end walls 58 and 61 may be made of any rigid, strong material such as, for example, steel. Each pivoting side support wall 46A and 46B may further have an outer recess 67 that will be described in more detail below.

Figure 5:
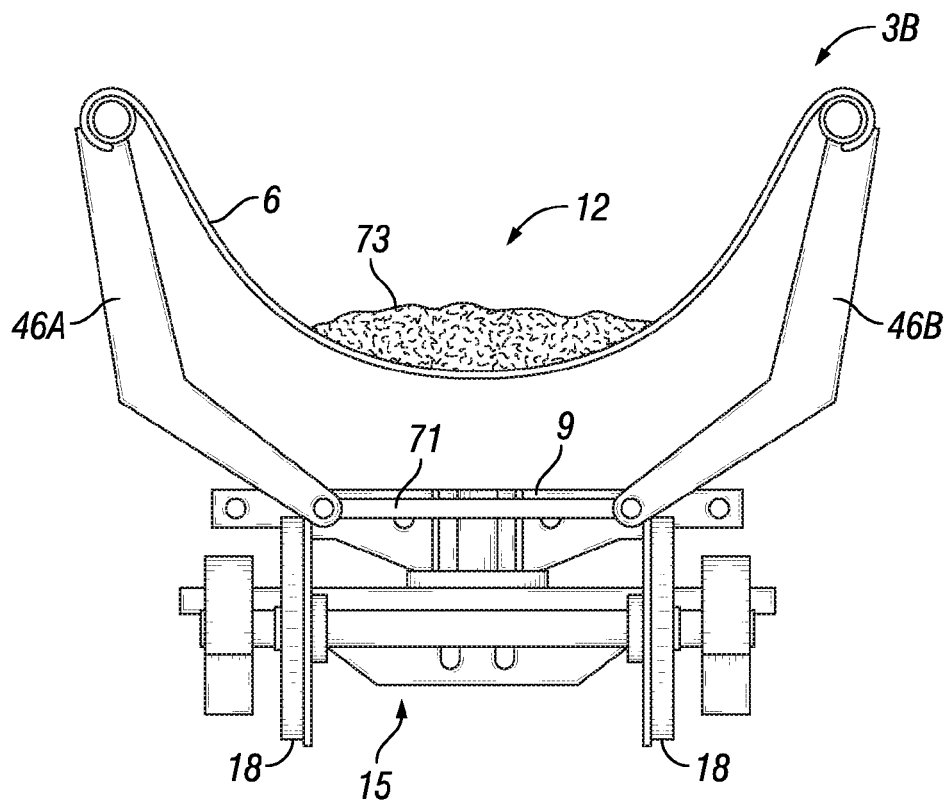
FIG. 5 is a cross section illustration of the side dump railroad car in a transporting configuration, according to certain embodiments.

FIG. 5 depicts both side support walls 46A and 46B in their intermediate positions, according to certain embodiments. The side support walls 46A and 46B may be locked into place in the intermediate positions by a locking assembly (not shown). The elastomeric mat 6 may have a transverse length such that when both side support walls 46A and 46B are in their intermediate positions, the elastomeric mat 6 may hang between the two side support walls 46A and 46B, forming a concave receptacle 12.

Figure 6:
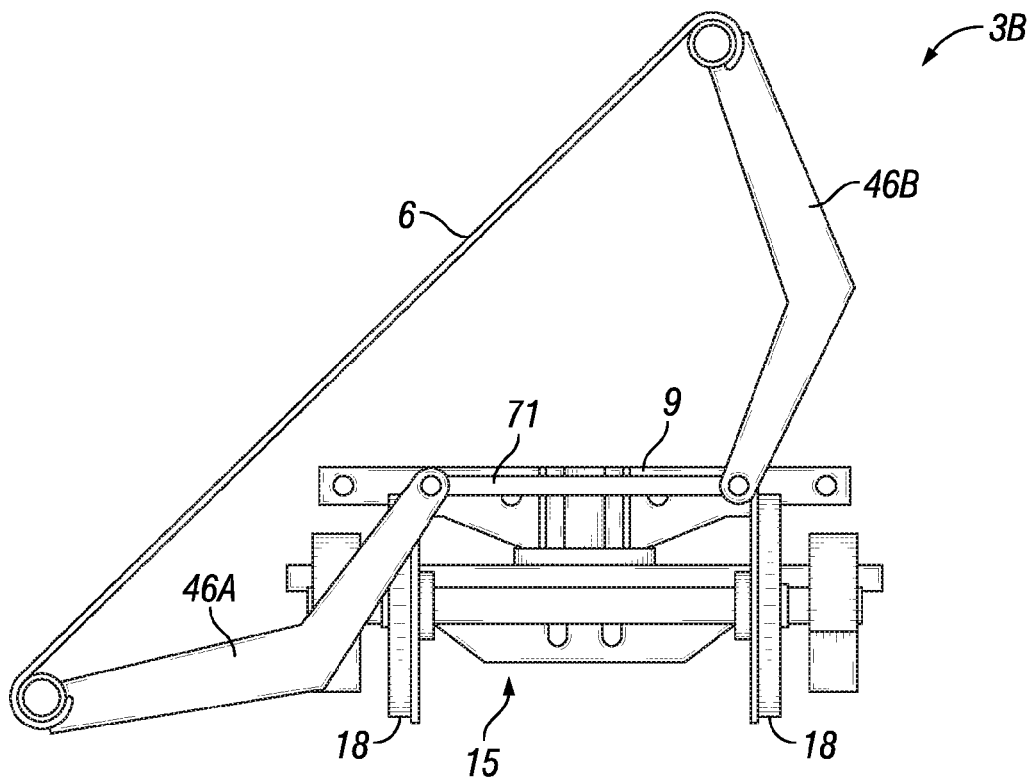
FIG. 6 is a cross section illustration of the side dump railroad car in a side-dumping configuration, according to certain embodiments.

As shown in FIG. 6, as one side support wall 46A is moved into its lowered position, it may apply a straightening tension to the mat 6, which decreases or eliminates the degree of concavity of the mat 6 (thereby flattening the mat 6). As the side support wall 46A is lowered into the reclined position, the other side support wall 46B may be simultaneously raised to its upright position, thus inclining the mat 6. As the mat 6 becomes flatter and more inclined, any aggregate material 73 contained in the receptacle 12 may be side-dumped from the car 3B. Aggregate material 73 may be likewise dumped from either side of the car 3B by selectively lowering one side support wall 46A or 46B and raising the other. If the side support walls 46A and 46B are pivoted into a side-dumping position, aggregate material 73 may be dispensed from the railroad car 3B. If the side support walls 46A and 46B are pivoted into a side-dumping position while the railroad car 3B is moving along a track, the railroad car 3B may dispense the aggregate material 73 onto a windrow along the track. By selectively lowering one side support wall 46A or 46B and raising the other side wall 46B or 46A, material 73 may be selectively dumped on whichever side of the track is desired.

The side dump railroad car 3B may include a linkage assembly 71 connected to the side support walls 46A and 46B. The linkage assembly 71 may provide opening and closing forces to the side support walls 46A and 46B, thereby causing the side support walls 46A and 46B to raise or lower. The linkage assembly 71 may also synchronize the two side support walls 46A and 46B with each other, raising one side support wall 46 as the other is being lowered. Such a linkage assembly 71 is known to one of ordinary skill in the art. Alternatively, the side support walls 46A and 46B may be lowered and/or raised independently of each other to allow the operator of the railroad car 3B to dump material from the car 3B at a desired output rate. The opening and closing forces may be supplied by a hydraulic system, pneumatic system, and/or any suitable system.

Each side support wall 46A and 46B may have two outer recesses 67 (shown in FIG. 4), each corresponding to a truck 15, such that when a side support wall 46A and 46B is in its lowered position (e.g., dump position), the trucks 15 on that side may be at least partially within the corresponding recesses 67. The recesses 67 may thus allow the side support walls 46A and 46B to pivot into a lowered position without colliding with the trucks 15.

The side dump railroad car 3B may have certain advantages over traditional side dump railroad cars. For example, the side dump railroad car 3B may have a lighter weight than a typical traditional side dump railroad car due to weight savings advantages of the elastomeric mats 6 over traditional steel construction, which may allow the railroad car 3B to haul more material while staying within weight limit restrictions. Another potential advantage is that the elastomeric mats 6 may resist clumping of wet or frozen aggregate material because of their flexible and elastic nature. Thus, the disadvantages of carry-back may be reduced or even eliminated by side dump railroad car 3B. This advantage may be especially pronounced in the side dump railroad car 3B because the elastomeric mat 6 may substantially change shape as the side support walls 46 apply tension to the elastomeric mat 6. Another potential advantage of the side dump railroad car 3B is that the elastomeric mats 6 may exhibit greater wear resistance than typical steel construction of traditional side dump railroad cars, which may result in lower operating costs compared to steel construction railroad cars. Another potential advantage of the side dump railroad car 3B is that the elastomeric mats 6 may flex and/or stretch as aggregate material is being loaded into the railroad car, thereby absorbing energy and reducing the noise and jarring impact caused by the aggregate materials falling into the railroad car 3B. Because the elastomeric mats 6A and 6B absorb this energy, the result may be reduced noise and less jarring impact to other components of the railroad car 3B, thereby reducing and/or preventing the need for repairs. Various embodiments may have none, some, or all of the foregoing advantages.

The elastomeric mats 6 may be made of one or more cured synthetic rubber sheets. The elastomeric mats 6 may be cured in a flat position, and then curved to a concave configuration as described in this disclosure. This may result in the rubber at the concave upper surface undergoing compression and the rubber at the convex lower surface undergoing tension. Alternatively, the mats 6 may be formed in a curved position and then inverted so that the upper surface undergoes compression and the lower surface undergoes tension. In another embodiment, the mats 6 may further comprise polymer fabric reinforcements embedded in areas prone to wear out. For example, corners of the mats 6 may be reinforced with heavy duty woven fabric of polyester or nylon yard embedded in the mats 6. The elastomeric mat 6 may comprise multiple layers of elastomer sheets, depending on the needs of the specific application.

The reinforcement cables 33 disclosed herein may have individually adjustable tensions by means already known in the art. For example, the tension of a cable 33 may be adjusted with turnbuckles. Thus, the tension of each cable 33 may be adjusted to provide equal support to the elastomeric mat 6 from all cables 33. The cables 33 may also be removable to allow for replacement and/or repair.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A bottom dump railroad car, comprising:
   a frame comprising a first side and a second side laterally opposing each other;
   a first elastomeric mat and a second elastomeric mat supported by a plurality of reinforcement cables, the first and second elastomeric mats forming a load-carrying receptacle, each elastomeric mat having an outer edge and an inner edge, the inner edge of the first elastomeric mat abutting the inner edge of the second elastomeric mat when the load-carrying receptacle is in a closed configuration;
   a first pulley connected to the first side of the frame, the first elastomeric mat wrapping at least partially around the first pulley; and
   a second pulley connected to the second side of the frame, the first pulley and second pulley each having a respective axis of rotation parallel to a direction of travel of the bottom dump railroad car, the second elastomeric mat wrapping at least partially around the second pulley.

2. The bottom dump railroad car of claim 1, wherein the first and second pulleys are configured to move the first and second elastomeric mats away from each other to form a discharge opening in the load-carrying receptacle.

3. The bottom dump railroad car of claim 1, wherein the first and second pulleys are configured to transition the load-carrying receptacle between the closed configuration and an open configuration.

4. The bottom dump railroad car of claim 1, wherein:
   the first elastomeric mat is flexible;
   a first brace is attached to the inner edge of the first elastomeric mat;
   a second brace is attached to the outer edge of the elastomeric mat, each brace comprising a plurality of holes through which reinforcement cables are threaded.

5. The bottom dump railroad car of claim 1, wherein the first pulley and the second pulley are elongated cylindrical pulleys.

6. The bottom dump railroad car of claim 1, further comprising a hopper that is formed of a rigid material and that is positioned above the load-carrying receptacle, the hopper comprising inclined sides that guide aggregate material into the load-carrying receptacle.

7. The bottom dump railroad car of claim 1, wherein the first elastomeric mat and the second elastomeric mat are flexible, elastic, and resistant to clumping of wet aggregate material.

8. The bottom dump railroad car of claim 1, wherein each elastomeric mat is configured to absorb energy and reduce noise caused by depositing aggregate material into the load-carrying receptacle.

9. The bottom dump railroad car of claim 1, wherein each elastomeric mat comprises one or more layers of cured synthetic rubber.

10. The bottom dump railroad car of claim 1, wherein each elastomeric mat comprises:
    at least two layers of cured synthetic rubber; and
    a polymer fabric embedded between at least a portion of the layers of cured synthetic rubber, the polymer fabric reinforcing the elastomeric mat.

11. A side dump railroad car, comprising:
    a frame comprising a first side and a second side laterally opposing each other;
    an elastomeric mat, supported by a plurality of reinforcement cables, forming a load-carrying receptacle and comprising a first lateral edge and a second lateral edge;

a first support wall rotatably connected to the first side of the frame, the first support wall further connected to the first edge of the elastomeric mat;

a second support wall rotatably connected to the second side of the frame, the second support wall further connected to the second edge of the elastomeric mat, the first and second support walls each having a respective axis of rotation parallel to a direction of travel of the side dump railroad car, the elastomeric mat suspended between the first and second support walls, wherein rotation of the first support wall from an inclined position to a dump position causes the second support wall to rotate from an inclined position to an upright position.

12. The side dump railroad car of claim 11, further comprising at least one linkage assembly that links the first and second support walls to each other and to the frame, the linkage assembly synchronizing rotation of the first and second support walls.

13. The side dump railroad car of claim 11, wherein:
the first support wall and the second support wall are in an inclined position when the load-carrying receptacle is used to transport aggregate material; and
when the first support wall and the second support wall are in the inclined position, the elastomeric mat is concavely suspended between the first support wall and the second support wall, the elastomeric mat supporting the aggregate material.

14. The side dump railroad car of claim 13, wherein rotation of the first support wall to a dump position causes the elastomeric mat to flatten and to incline such that the aggregate material is dumped parallel to the first side of the frame.

15. The side dump railroad car of claim 11, wherein the elastomeric mat is flexible, elastic, and resistant to clumping of wet aggregate material.

16. The side dump railroad car of claim 11, wherein the elastomeric mat is configured to absorb energy and reduce noise caused by depositing aggregate material into the load-carrying receptacle.

17. The side dump railroad car of claim 11, wherein the elastomeric mat comprises one or more layers of cured synthetic rubber.

18. The side dump railroad car of claim 11, wherein the elastomeric mat comprises:
at least two layers of cured synthetic rubber; and
a polymer fabric embedded between at least a portion of the layers of cured synthetic rubber, the polymer fabric reinforcing the elastomeric mat.

19. A bottom dump railroad car, comprising:
a frame comprising a first side and a second side laterally opposing each other;
a first elastomeric mat and a second elastomeric mat supported by a plurality of reinforcement cables, the first and second elastomeric mats forming a load-carrying receptacle for an aggregate material, each elastomeric mat having an outer edge and an inner edge, the inner edge of the first elastomeric mat abutting the inner edge of the second elastomeric mat when the load-carrying receptacle is in a closed configuration; and
at least one pulley assembly that, when the aggregate material is to be dumped, moves the first and second elastomeric mats away from each other to form a discharge opening.

\* \* \* \* \*